United States Patent
Gautron et al.

(10) Patent No.: US 10,565,781 B2
(45) Date of Patent: Feb. 18, 2020

(54) VIEW-DEPENDANT SHADING NORMAL ADAPTATION

(71) Applicant: Nvidia Corporation, Santa Clara, CA (US)

(72) Inventors: Pascal Gautron, Berlin (DE); Dietger van Antwerpen, Berlin (DE); Carsten Waechter, Berlin (DE); Matthias Raab, Berlin (DE)

(73) Assignee: Nvidia Corporation, Santa Clara, CA (US)

( * ) Notice: Subject to any disclaimer, the term of this patent is extended or adjusted under 35 U.S.C. 154(b) by 123 days.

(21) Appl. No.: 14/875,813

(22) Filed: Oct. 6, 2015

(65) Prior Publication Data
US 2017/0053433 A1    Feb. 23, 2017

Related U.S. Application Data

(60) Provisional application No. 62/207,496, filed on Aug. 20, 2015.

(51) Int. Cl.
*G06T 15/50* (2011.01)
*G06T 15/83* (2011.01)
*G06T 17/20* (2006.01)

(52) U.S. Cl.
CPC ............ *G06T 15/83* (2013.01); *G06T 15/506* (2013.01); *G06T 17/20* (2013.01)

(58) Field of Classification Search
CPC .. G06T 15/506; G06T 15/80–87; G06T 17/20
See application file for complete search history.

(56) References Cited

U.S. PATENT DOCUMENTS

| 6,438,266 B1 * | 8/2002 | Bajaj | G06T 9/001 |
| | | | 382/154 |
| 2004/0056858 A1 * | 3/2004 | Ohba | G06T 15/80 |
| | | | 345/419 |

OTHER PUBLICATIONS

"Consistent Normal Interpolation", Alexander Reshetov, et al., ACM Transactions on Graphics, vol. 29, No. 6, Article 142; Dec. 2010, 8 pgs.

\* cited by examiner

*Primary Examiner* — Charles Tseng

(57) ABSTRACT

A method of adjusting a shading normal vector for a computer graphics rendering program. Calculating a normalized shading normal vector pointing outwards from an origin point on a tessellated surface modeling a target surface to be rendered. Calculating a normalized outgoing reflection vector projecting from the origin point for an incoming view vector directed towards the origin point and reflecting relative to the normalized shading normal vector. Calculating a correction vector such that when the correction vector is added to the normalized outgoing reflection vector a resulting vector sum is yielded that is equal to a maximum reflection vector, wherein the maximum reflection vector is on or above the tessellated surface. Calculating a normalized maximum reflection vector by normalizing a vector sum of the correction vector plus the maximum reflection vector. Calculating a normalized adjusted shading normal vector by normalizing a vector difference of the normalized maximum reflection vector minus the incoming view vector.

20 Claims, 6 Drawing Sheets

VIEW-DEPENDANT SHADING NORMAL ADAPTATION

CROSS-REFERENCE TO RELATED APPLICATION

This application claims the benefit of U.S. Provisional Application Ser. No. 62/207,496, filed by Pascal Gautron et al. on Aug. 20, 2015, entitled "VIEW-DEPENDENT SHADING NORMAL ADAPTATION," commonly assigned with this application and incorporated herein by reference.

TECHNICAL FIELD

This application is directed, in general, to computerized rendering of images and, more specifically, to a method, system and computer program for adjusting shading normal vectors used in rendering images.

BACKGROUND

The rapid calculation and display of computer graphical images, e.g., three-dimensional objects in video games, often relies upon the rendering of images using tessellated surfaces, such as triangles or other tiled surfaces. Disparities between the shapes of a target surface and a tessellated surface rendering the target surface, can lead to visual artifacts, such as faceting. To reduce such artifacts, shading or vertex normal vectors can be calculated by interpolating normal vectors over the tessellated surface. Then the shading normal vectors are applied, as part of the rendering program, to make the rendered surface appear more smooth or continuous.

SUMMARY

One aspect provides a method of adjusting a shading normal vector for a computer graphics rendering program. Embodiments of the method can comprise calculating a normalized shading normal vector pointing outwards from an origin point on a tessellated surface modeling a target surface to be rendered. Embodiments of the method can comprise calculating a normalized outgoing reflection vector projecting from the origin point for an incoming view vector directed towards the origin point and reflecting relative to the normalized shading normal vector. Embodiments of the method can comprise calculating a correction vector such that when the correction vector is added to the normalized outgoing reflection vector a resulting vector sum is yielded that is equal to a maximum reflection vector, wherein the maximum reflection vector is on or above the tessellated surface. Embodiments of the method can comprise calculating a normalized maximum reflection vector by normalizing a vector sum of the correction vector plus the maximum reflection vector. Embodiments of the method can comprise calculating a normalized adjusted shading normal vector by normalizing a vector difference of the normalized maximum reflection vector minus the incoming view vector.

Another aspect is a non-transient computer-readable storage medium storing instructions that, when executed by a computer processing unit, causes the computer processing unit to compute an adjusted shading normal vector including any of the above-disclosed calculations.

Still another aspect is a computer graphics rendering system, the system comprising a computer processing unit configured to compute an adjusted shading normal vector including any of the above-disclosed calculations.

BRIEF DESCRIPTION

Reference is now made to the following descriptions taken in conjunction with the accompanying drawings, in which.

Figure 1:
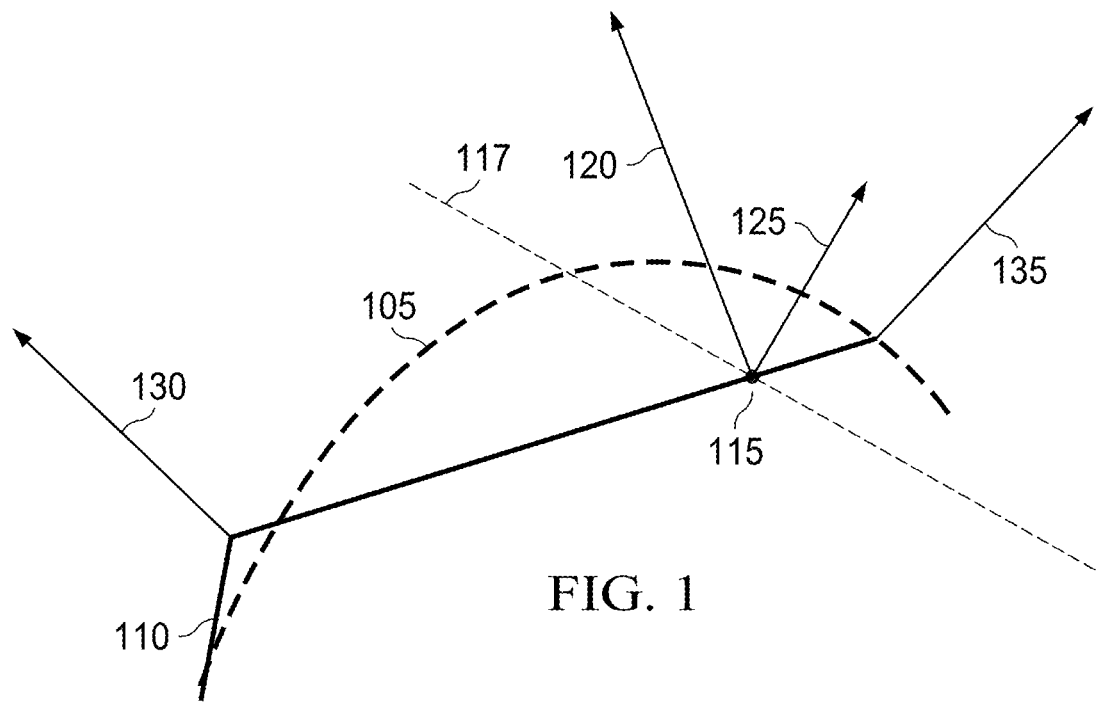
FIG. 1 illustrates an example geometric normal vector and shading normal vector for an origin point on a tessellated surface modeling a target surface to be rendered.
Figure 2:
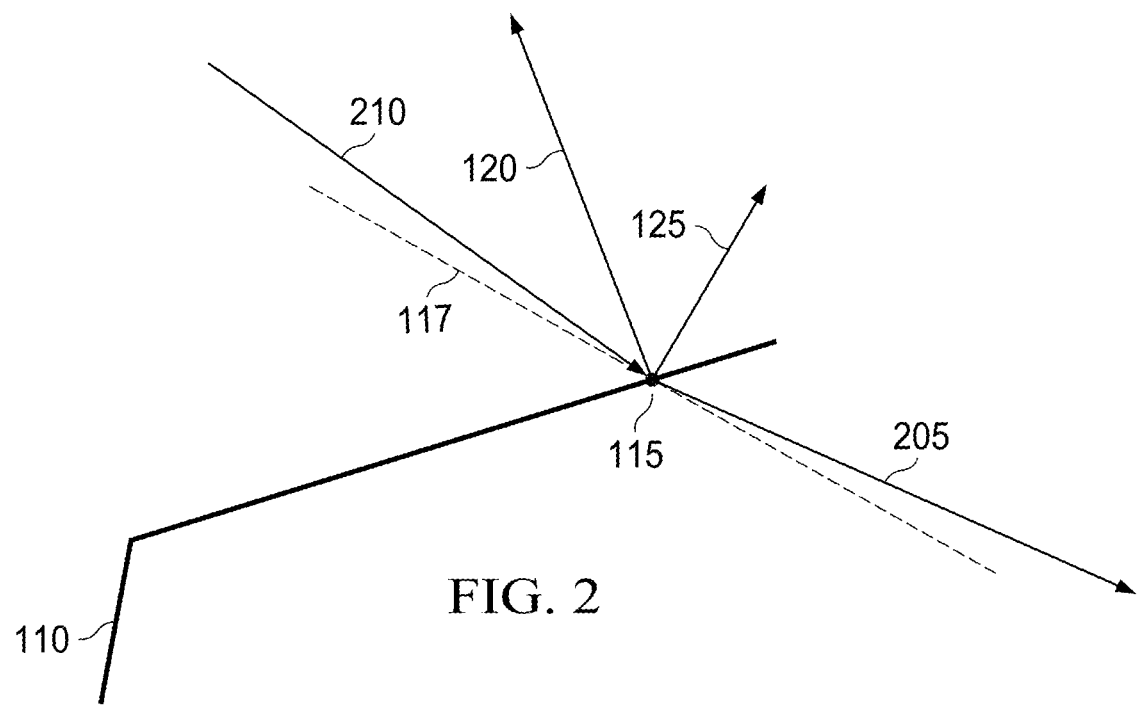
FIG. 2 illustrates an example outgoing reflection vector projecting from the origin point into the tessellated surface presented in FIG. 1 for an incoming view vector directed towards the origin point when the outgoing reflection vector is calculated using the shading normal vector.
Figure 4:
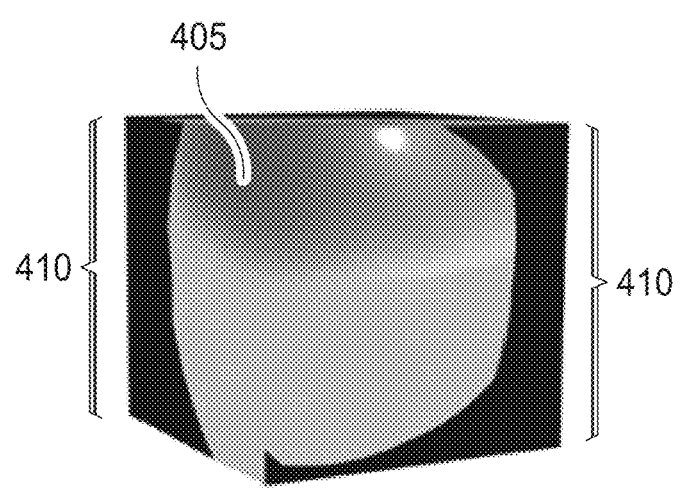
Figure 5:
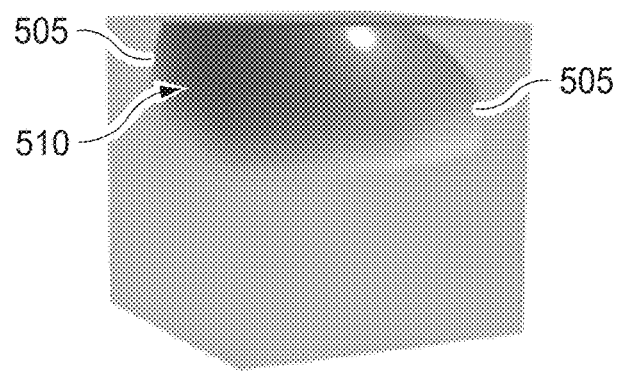
Figure 7:
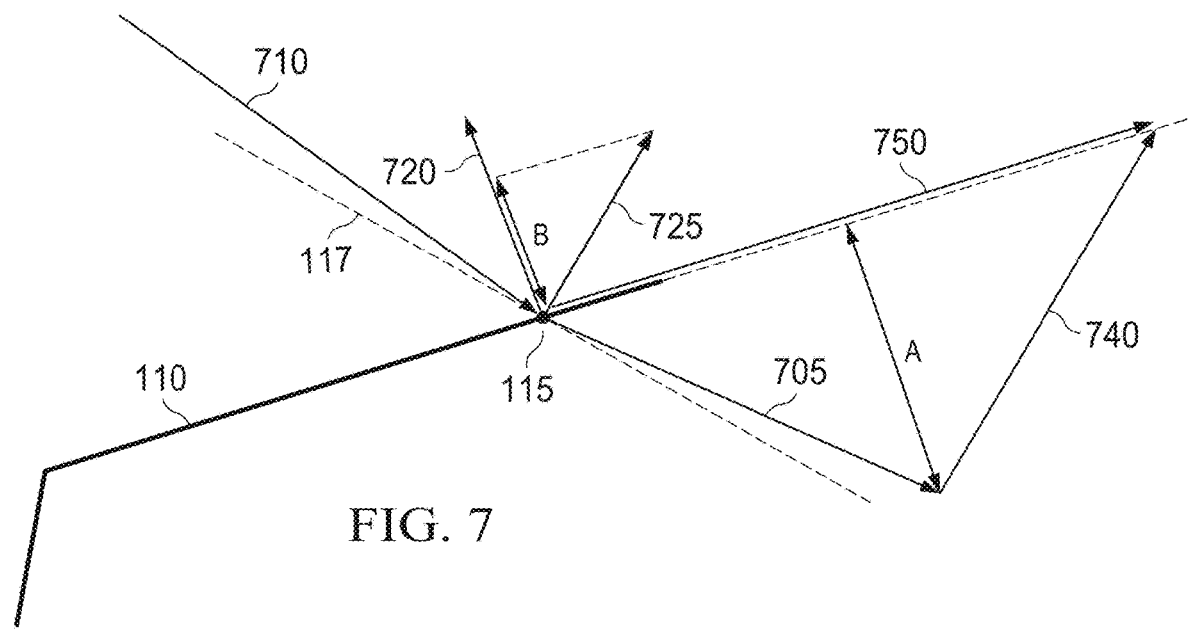
Figure 6:
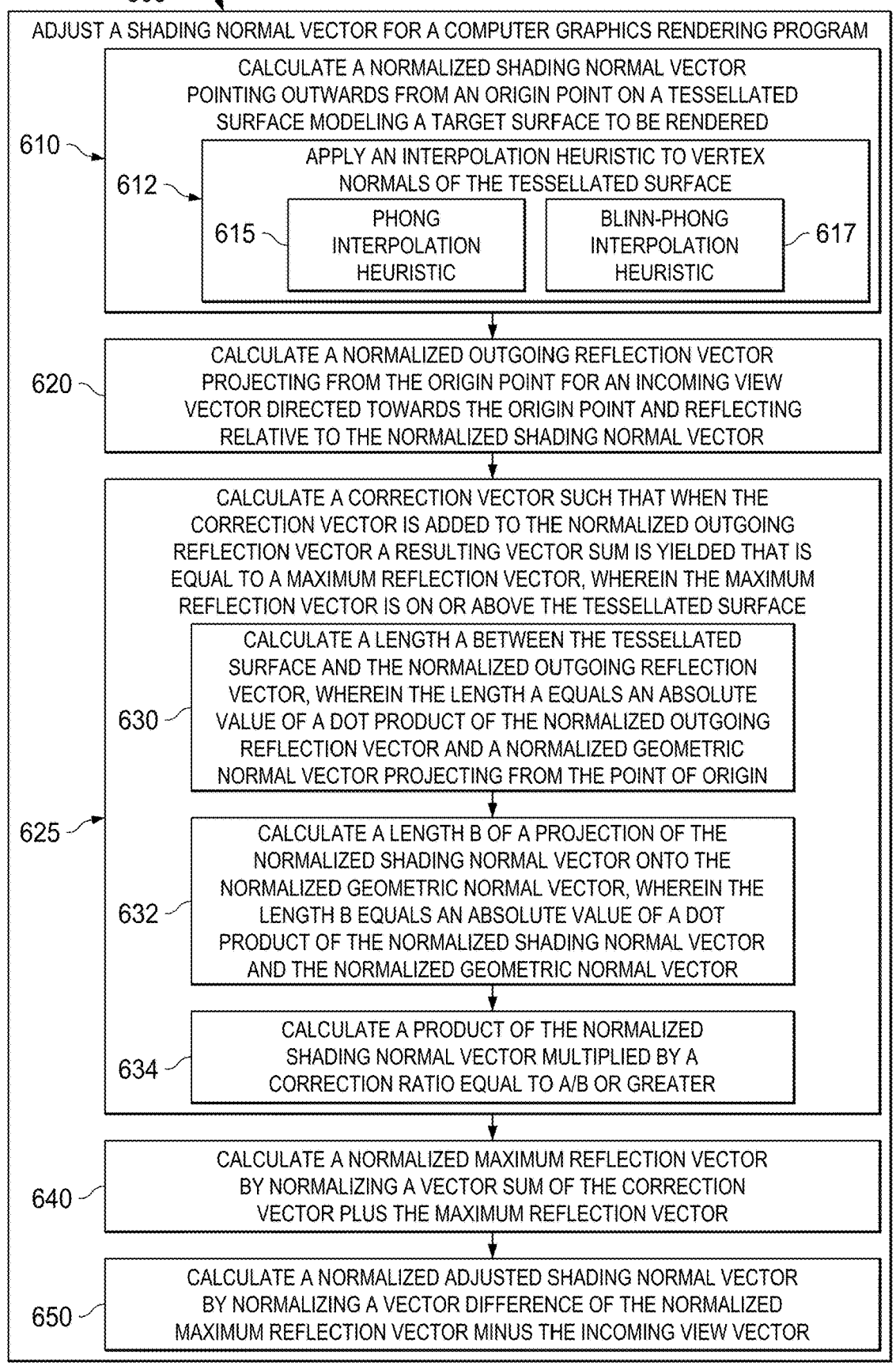
Figure 8:
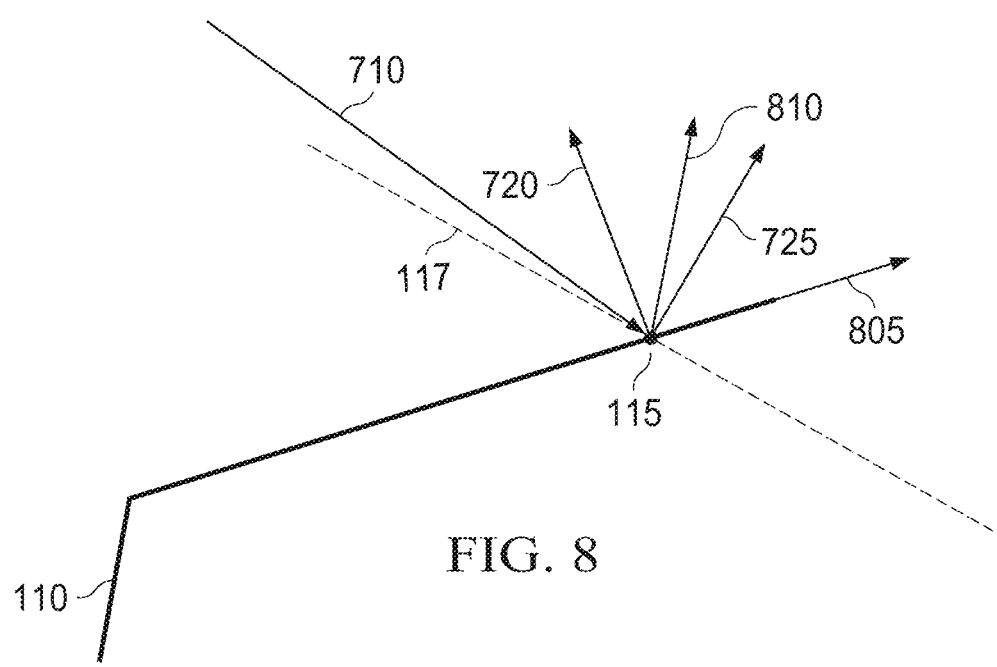
Figure 9:
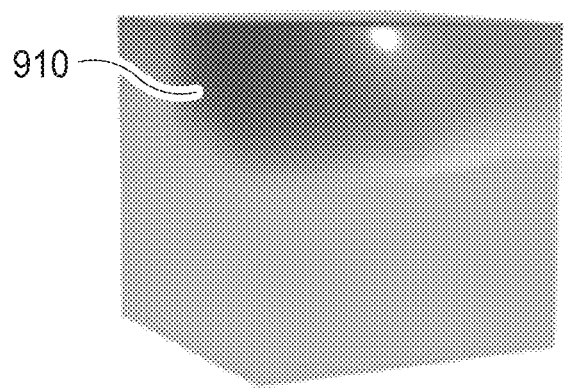
Figure 10:
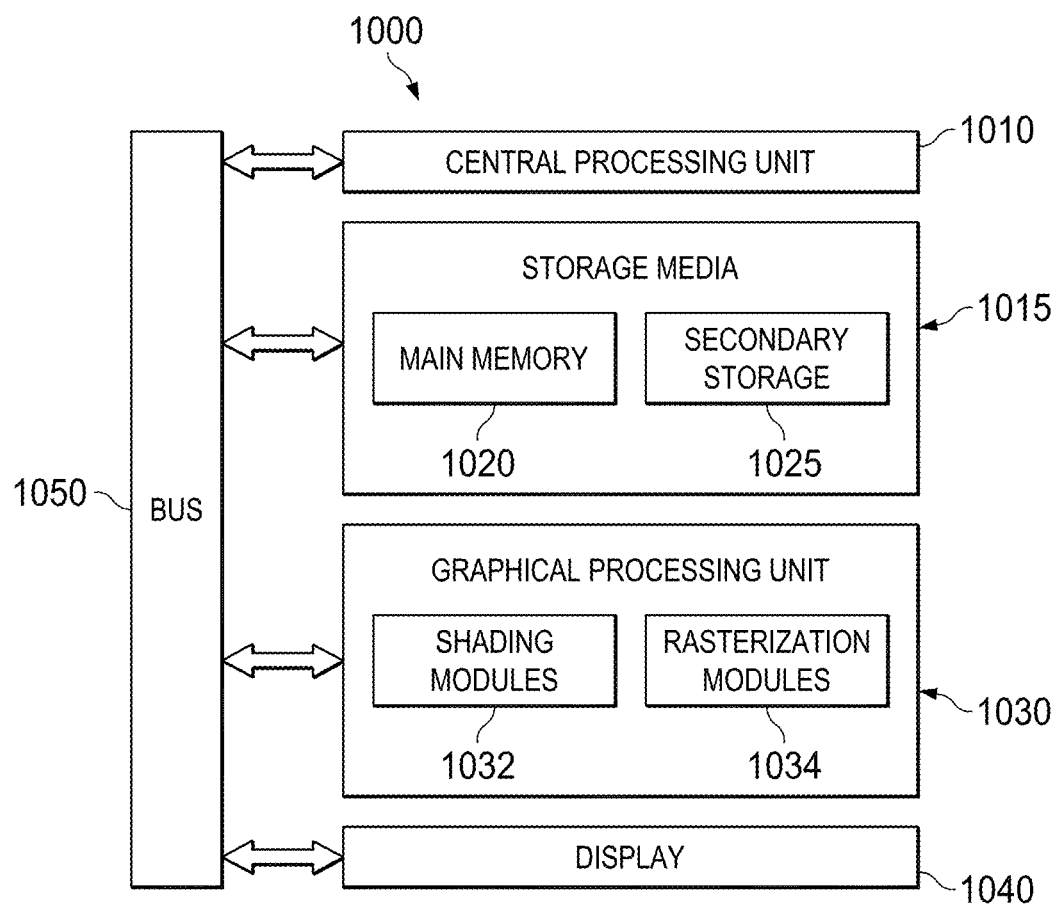

FIG. 4 presents an example computer rendered image of an object using shading normal vectors to calculate outgoing reflection vectors such as described in the context of FIG. 2;

FIG. 5 presents another example computer rendered image of the same object as depicted in FIG. 4 using example blended shading normal vectors to calculate outgoing reflection vectors;

FIG. 6 presents a flow diagram of a method of adjusting a shading normal vector for a computer graphics rendering program, according to the principles of the disclosure;

FIG. 7 illustrates the same example set as presented in FIG. 2 with intermediate steps in the calculation of an adjusted shading normal vector in according to the principles of the disclosure such as illustrated in FIG. 1;

FIG. 8 illustrates the same example scheme as presented in FIG. 2 with further steps in the calculation of an adjusted shading normal vector in accordance with the method embodiment of the invention such as an embodiment illustrated in FIG. 1;

FIG. 9 presents an example computer rendered image of an object using adjusted shading normal vectors calculated such as described in the context of FIGS. 6 and 7; and FIG. 10 illustrates a block diagram of an example computer system configured to employ the method of adjusting a shading normal vector according to the principles of the disclosure such as discussed in the context of FIGS. 6-9.

DETAILED DESCRIPTION

For certain reflection models, the disparity between the target surface and the tessellated surface can be so large that visual artifacts may be present, even for images rendered using shading normal vectors. For instance, for certain incoming view directions, a valid reflection direction cannot be computed. The inventors have recognized that artifacts in the rendered images may arise due to the discrepancy between the direction of a geometric normal and the direction of a shading normal vector such that the reflection direction points towards the inside of the tessellated surface.

To illustrate aspects of such artifacts, consider an example reflection model for example geometric and shading normal vectors, assuming a tessellated surface modeling a target surface to be rendered as illustrated in FIG. 1. FIG. 1 illustrates portions of a target surface 105 that is modeled by portions of a tessellated surface 110. An arbitrarily chosen origin point 115 and associated horizon 117 on the tessellated surface 110 are presented for the purposes of illustration. As further illustrated in FIG. 1, a geometric normal vector 120 can be calculated, and, a shading normal vector 125 for the origin point 115 can be calculated relative to vertex normal vectors 130, 135, using interpolation procedures familiar to one skilled in the pertinent art.

FIG. 2 presents the same reflection model as illustrated in FIG. 1 where, for clarity, the target surface 105 and vertex normal vectors 130, 135 are not shown. FIG. 2 illustrates an example outgoing reflection vector 205 calculated assuming an incoming view vector 210 directed towards the origin point 115. The reflection is calculation assuming that the tessellated surface 110 is a perfect mirrored surface and that the reflection is relative to the shading normal vector 125. For this example reflection model, the calculated shading normal vector 125 does not face the viewing direction vector. Consequently, the outgoing reflection vector 205 calculated relative to this shading normal vector 125, invalidly projects from the origin point 115 inside of or below the tessellated surface 110.

Figure 3:
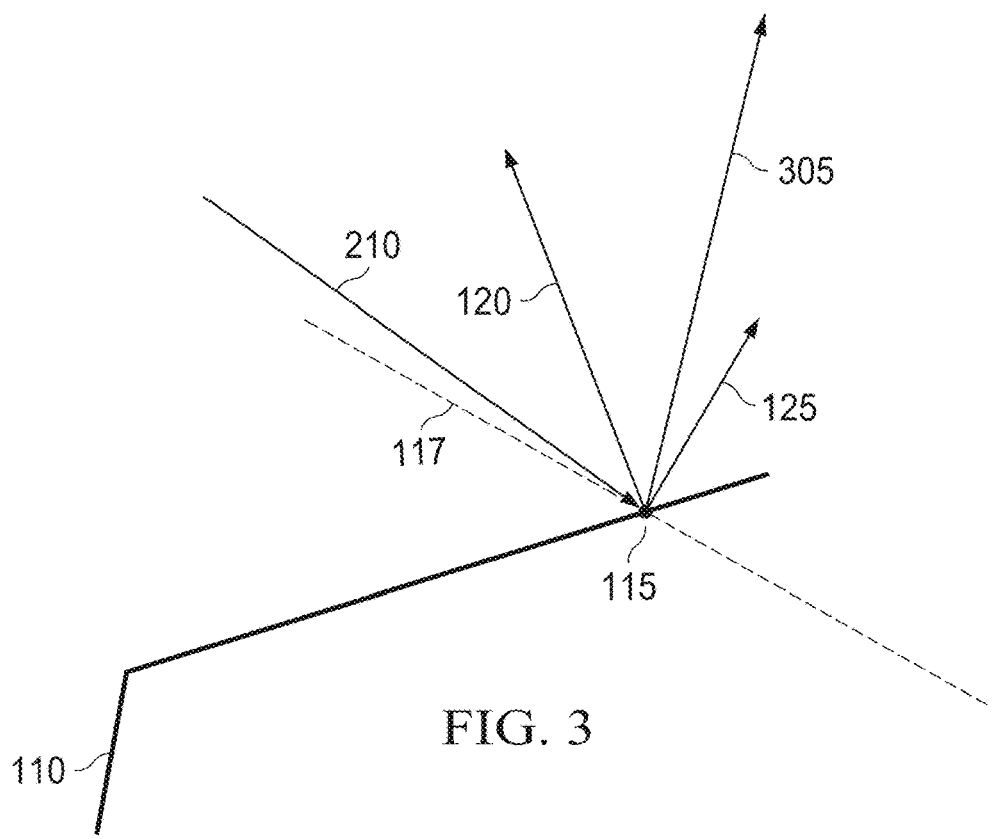
FIG. 3 illustrates an example outgoing reflection vector projecting from the origin point into the tessellated surface presented in FIG. 1 for an incoming view vector directed towards the origin point when the outgoing reflection vector is calculated using the geometric normal vector.

For comparison, FIG. 3 presents a reflection model similar to that presented in FIGS. 1 and 2 except that the outgoing reflection vector 305 is calculated relative to the geometric normal vector 120. Consequently, the outgoing reflection vector validly projects from the origin point 115 to above the tessellated surface 110. However, as noted previously using geometric normal vectors can give rise to faceting artifacts in rendered images.

FIG. 4 presents an example computer rendered image of an object 405, e.g., a sphere, showing the consequence of rendering the image with a reflection model that uses the shading normal vector 125 such as described in the context of FIG. 3. For certain view directions, when the shading normal vector faces away from the viewing direction, a meaningful outgoing reflection vector cannot be calculated because the outgoing reflection vector 205 projects inside of, or below, the surface of the object. Areas where a meaningful reflection cannot be calculated is represented by the edge-darkened regions 410 present in the rendered image 405 shown in FIG. 4.

Efforts to mitigate such rendering artifacts can include calculating a blended shading normal vector by applying a blending parameter to the shading normal vector. The blending parameter can be calculated according to a mathematical heuristic that may depend upon the particular material or object to be rendered. As illustrated in FIG. 5, using such blended shading normal vectors, however, may introduce new artifacts, such as discontinuities at the edges 505 of the rendered image 510.

As disclosed herein, to avoid the application of invalid shading normal vectors in image rendering, shading normal vectors are adjusted to produce adjusted shading normal vectors. The disclosed embodiments thereby facilitate adjusting invalid shading normal vectors in a continuous manner to become valid adjusted shading normal vectors, while minimizing the introduction of new artifacts and not compromising the quality of image rendering for regions of an image where the shading normal vector is already valid.

One embodiment is a method of adjusting a shading normal vector for a computer graphics rendering program. FIG. 6 presents a flow diagram of various embodiments of such a method 600.

FIG. 7 illustrates the same example reflection model as presented in FIG. 2 and intermediate steps in the calculation of an adjusted shading normal vector in accordance with the method 600 as described in the context of FIG. 6. FIG. 8 illustrates the same example reflection model as presented in FIG. 2 with further steps in the calculation of an adjusted shading normal vector in accordance with principles of the method 600.

With continuing references to FIGS. 6-8 throughout, the method 600 comprises a step 610 of calculating a normalized shading normal vector 725 pointing outwards from an origin point 115 on a tessellated surface 110 modeling a target surface (e.g., surface 105 in FIG. 1) to be rendered. For instance, in some embodiments, calculating a normalized shading normal vector 725 (step 610) includes applying, in step 612, an interpolation heuristic to vertex normals (e.g., vertex normals 130, 135 in FIG. 1) of the tessellated surface 110. In some embodiments, for instance, the interpolation heuristic applied in step 612 includes a Phong interpolation heuristic (step 615) or a Blinn-Phong interpolation heuristic (step 617). One skilled in the pertinent art would understand how to apply these and similar interpolation heuristics to calculate a shading normal vector. One skilled in the pertinent art would understand how to calculate a normalized shading normal vector, by dividing the shading normal vector by the norm of the shading normal vector.

The method 600 also comprises a step 620 of calculating a normalized outgoing reflection vector 705 projecting from the origin point 115 for an incoming view vector 710 directed towards the origin point 115 and reflecting relative to the normalized shading normal vector 725.

The method 600 further comprises a step 625 of calculating a correction vector 740 such that when the correction vector 740 is added to the normalized outgoing reflection vector 705, a resulting vector sum is yielded that is equal to a maximum reflection vector 750 that is on or above the tessellated surface 110.

In some embodiments, calculating the correction vector 740 (step 625) can include a step 630 of calculating a length A between the tessellated surface 110 and the normalized outgoing reflection vector 705. The length A equals an absolute value of a dot product of the normalized outgoing reflection vector 705 and a normalized geometric normal vector 720 projecting from the point of origin 115. Calculating the correction vector 740 can include a step 632 of calculating a length B of a projection of the normalized shading normal vector 725 onto the normalized geometric normal vector 720. The length B equals an absolute value of a dot product of the normalized shading normal vector and the normalized geometric normal vector. Calculating the correction vector 740 can include a step 634 of calculating a product of the normalized shading normal vector multiplied by a correction ratio that is equal to or greater than length A divided by length B (A/B).

For instance, when the correction ratio equals A/B then the correction vector 740 is such that, when added to the normalized outgoing reflection vector 705, the resulting vector sum yields a maximum reflection vector 750 that lies on the tessellated surface 110, such as illustrated in FIG. 7. For instance, when the correction ratio is greater than A/B then the correction vector 740 is such that, when added to the normalized outgoing reflection vector 705, the resulting vector sum yields a maximum reflection vector 750 that lies above the tessellated surface 110. In some embodiments, the correction ratio is a value in a range between A/B and (2A)/B.

The method 600 also comprises a step 640 of calculating a normalized maximum reflection vector 805 by normalizing a vector sum of the correction vector 740 plus the maximum reflection vector 750.

The method 600 further comprises a step 650 of calculating a normalized adjusted shading normal vector 810 by normalizing a vector difference of the normalized maximum reflection vector 805 minus the incoming view vector 710.

FIG. 9 presents an example computer rendered image of an object 910 using normalized adjusted shading normal vectors calculated using an embodiment of the method as described in the context of FIGS. 6-8.

As illustrated in FIG. 9, the application of the adjusted shading normal vectors produces rendered image 910 that is substantially free of artifacts such as edge darkening or edge discontinuities such as presented in FIGS. 4-5. The avoidance of such artifacts is particularly notable for reflection models where incoming view vector 710, the normalized geometric normal vector 720 and the normalized shading normal vector 725 are not all in the same plane.

Another embodiment is a computer graphics rendering system. FIG. 10 illustrates a block diagram of an example computer graphics rendering computer system 1000 configured to employ the method of adjusting a shading normal vector according to the principles of the disclosure such as discussed in the context of FIGS. 6-9.

Embodiments of the system 1000 can include a central processing unit 1010, e.g., configured as a host processor. Embodiments of the system 1000 can include storage medium 1015, such as main memory 1020 (e.g., random access memory, RAM) and secondary storage 1025. The storage medium 1015 can non-transiently store control logic software and data representing objects or materials to be rendered into images by the system 1000. Non-limiting examples of main memory 1020 include, e.g., random access memory (RAM). Non-limiting examples of secondary storage 1025 include hard disk drives, removable storage drive, such as floppy disk drives, a magnetic tape drive, or a compact disk drive.

Embodiments of the system 1000 can also include a graphical processing unit 1030. In some embodiments, to facilitate performing the steps of the method, the graphical processing unit 1030 can include a plurality of shading processing modules 1032 and rasterization processing modules 1034. In some embodiments such modules can be further configured to apply the adjusted shading normals as part of shading a surface (e.g., the tessellated surface 110) for rendering a computer graphics image. In other embodiments of the system 1000, the central processing unit 1010 can be configured to perform these computations.

Embodiments of the system 1000 can include a display 1040, e.g., a computer monitor or other user interface. In some embodiments of the system 1000 a communication bus 1050 can interconnect any one or more of the central processing unit 1010, main and secondary memory 1020, 1025, graphical processing unit 1030, and display 1040.

In some embodiments, the shading processing modules 1032 and rasterization processing modules 1034 can be situated on a single semiconductor platform to form the graphics processing unit 1030. In some embodiments the single semiconductor platform of the graphics processing unit 1030 can include unitary semiconductor-based integrated circuit (IC) such as an application specific system on chip (ASIC). Embodiments of the single semiconductor platform can include multi-chip modules with increased connectivity which simulates on-chip operations to provide improvements over conventional central processing unit (CPU) and bus implementations. In other embodiments, one or more of the components of the system 1000 can be situated separately or in various combinations on different semiconductor platforms. Embodiments of the system 1000 can include reconfigurable logic central processing units 1010 and/or graphical processing units 1030 including but not limited to field programmable gate arrays (FPGAs).

Computer-readable instructions such as computer programs, including computer control logic algorithms, can be non-transiently stored in the storage media, e.g., either or both of the main memory 1020 and the secondary storage 1025. The instructions, when executed by a computer processing unit, enable the system 1000 to perform various embodiments of the method of adjusting a shading normal vector, such as any of the steps of the method 600 disclosed in the context of FIGS. 6-9.

Non-limiting example embodiments of the computer system 1000 include general computer systems, a circuit board system, a game console system dedicated for entertainment purposes, an application-specific system, or other computer system familiar to one skilled in the pertinent art. For example, the computer system 1000 can be embodied in the form of a desktop computer, laptop computer, personal digital assistant (PDA) device, a mobile phone device, a television, etc. In some embodiments, the computer system 1000 can be coupled to a network, e.g. a telecommunications network, local area network (LAN), wireless network, wide area network (WAN) such as the Internet, peer-to-peer network, cable network, etc. for communication purposes.

Those skilled in the art to which this application relates will appreciate that other and further additions, deletions, substitutions and modifications may be made to the described embodiments.

What is claimed is:

1. A method of adjusting a shading normal vector for a computer graphics rendering program, comprising:
    calculating a normalized shading normal vector pointing outwards from an origin point on a tessellated surface modeling a target surface to be rendered;
    calculating a normalized outgoing reflection vector projecting from the origin point for an incoming view vector directed towards the origin point and reflecting relative to the normalized shading normal vector;
    calculating a correction vector such that when the correction vector is added to the normalized outgoing reflection vector a resulting vector sum is yielded that is equal to a maximum reflection vector, wherein the maximum reflection vector is on or above the tessellated surface;
    calculating a normalized maximum reflection vector by normalizing a vector sum of the correction vector plus the maximum reflection vector;
    calculating a normalized adjusted shading normal vector by normalizing a vector difference of the normalized maximum reflection vector minus the incoming view vector; and
    applying the normalized adjusted shading normal vector to shade the tessellated surface for rendering a computer graphics image to minimize visual artifacts in the computer graphics image.

2. The method of claim 1, wherein calculating the correction vector includes:
    calculating a length A between the tessellated surface and the normalized outgoing reflection vector, wherein the length A equals an absolute value of a dot product of the normalized outgoing reflection vector and a normalized geometric normal vector projecting from the point of origin;
    calculating a length B of a projection of the normalized shading normal vector onto the normalized geometric normal vector, wherein the length B equals an absolute value of a dot product of the normalized shading normal vector and the normalized geometric normal vector; and calculating a product of the normalized shading normal vector multiplied by a correction ratio equal to or greater than A/B.

3. The method of claim 2, wherein the correction ratio equals A/B.

4. The method of claim 2, wherein the correction ratio is a value in a range between A/B and (2A)/B.

5. The method of claim 1, wherein calculating the normalized shading normal vector includes applying an interpolation heuristic to vertex normals of the tessellated surface.

6. The method of claim 5, wherein the interpolation heuristic includes a Phong interpolation heuristic.

7. The method of claim 5, wherein the interpolation heuristic includes a Blinn-Phong interpolation heuristic.

8. A non-transitory computer-readable storage medium storing instructions that, when executed by a processor, cause the processor to compute an adjusted shading normal vector, comprising:

calculating a normalized shading normal vector pointing outwards from an origin point on a tessellated surface modeling a target surface to be rendered;

calculating a normalized outgoing reflection vector projecting from the origin point for an incoming view vector directed towards the origin point and reflecting relative to the normalized shading normal vector;

calculating a correction vector such that when the correction vector is added to the normalized outgoing reflection vector a resulting vector sum is yielded that is equal to a maximum reflection vector, wherein the maximum reflection vector is on or above the tessellated surface;

calculating a normalized maximum reflection vector by normalizing a vector sum of the correction vector plus the maximum reflection vector;

calculating a normalized adjusted shading normal vector by normalizing a vector difference of the normalized maximum reflection vector minus the incoming view vector; and applying the normalized adjusted shading normal vector to shade the tessellated surface for rendering a computer graphics image to minimize visual artifacts in the computer graphics image.

9. The non-transitory storage medium of claim 8 further stores instructions to cause the processor to calculate the correction vector including:

calculating a length A between the tessellated surface and the normalized outgoing reflection vector, wherein the length A equals an absolute value of a dot product of the normalized outgoing reflection vector and a normalized geometric normal vector projecting from the point of origin;

calculating a length B of a projection of the normalized shading normal vector onto the normalized geometric normal vector, wherein the length B equals an absolute value of a dot product of the normalized shading normal vector and the normalized geometric normal vector; and calculating a product of the normalized shading normal vector multiplied by a correction ratio equal to or greater than A/B.

10. The non-transitory storage medium of claim 9, wherein the correction ratio equals A/B.

11. The non-transitory storage medium of claim 9, wherein the correction ratio is a value in a range between A/B and (2A)/B.

12. The non-transitory storage medium of claim 8, wherein calculating the normalized shading normal vector includes applying an interpolation heuristic to vertex normals of the tessellated surface.

13. The non-transitory storage medium of claim 12, wherein the interpolation heuristic includes a Phong interpolation heuristic.

14. The non-transitory storage medium of claim 12, wherein the interpolation heuristic includes a Blinn-Phong interpolation heuristic.

15. A computer graphics rendering system, comprising:
a non-transitory computer-readable storage medium;
a processor configured to execute instructions stored on the non-transitory computer-readable storage medium to compute an adjusted shading normal vector, including:

calculating a normalized shading normal vector pointing outwards from an origin point on a tessellated surface modeling a target surface to be rendered;

calculating a normalized outgoing reflection vector projecting from the origin point for an incoming view vector directed towards the origin point and reflecting relative to the normalized shading normal vector;

calculating a correction vector such that when the correction vector is added to the normalized outgoing reflection vector a resulting vector sum is yielded that is equal to a maximum reflection vector, wherein the maximum reflection vector is on or above the tessellated surface;

calculating a normalized maximum reflection vector by normalizing a vector sum of the correction vector plus the maximum reflection vector;

calculating a normalized adjusted shading normal vector by normalizing a vector difference of the normalized maximum reflection vector minus the incoming view vector; and applying the normalized adjusted shading normal vector to shade the tessellated surface for rendering a computer graphics image to minimize visual artifacts in the computer graphics image.

16. The system of claim 15, wherein the processor is configured to execute the instructions to calculate the correction vector including:

calculating a length A between the tessellated surface and the normalized outgoing reflection vector, wherein the length A equals an absolute value of a dot product of the normalized outgoing reflection vector and a normalized geometric normal vector projecting from the point of origin;

calculating a length B of a projection of the normalized shading normal vector onto the normalized geometric normal vector, wherein the length B equals an absolute value of a dot product of the normalized shading normal vector and the normalized geometric normal vector; and calculating a product of the normalized shading normal vector multiplied by a correction ratio equal to or greater than A/B.

17. The system of claim 15, wherein the processor includes a graphical processing unit configured to execute at least some of the instructions.

18. The system of claim 15, wherein the processor includes a central processing unit configured to execute at least some of the instructions.

19. A computer graphics rendering system to minimize visual artifacts in a computer rendered image, comprising:
a non-transitory computer-readable storage medium;
a processor configured to execute instructions stored on the non-transitory computer-readable storage medium to compute an adjusted shading normal vector, including:
calculating a normalized shading normal vector pointing outwards from an origin point on a tessellated surface modeling a target surface to be rendered;
calculating a normalized outgoing reflection vector projecting from the origin point for an incoming view vector directed towards the origin point and reflecting relative to the normalized shading normal vector;
calculating a correction vector such that when the correction vector is added to the normalized outgoing reflection vector a resulting vector sum is yielded that is equal to a maximum reflection vector, wherein the maximum reflection vector is on or above the tessellated surface;
calculating a normalized maximum reflection vector by normalizing a vector sum of the correction vector plus the maximum reflection vector;
calculating a normalized adjusted shading normal vector by normalizing a vector difference of the normalized maximum reflection vector minus the incoming view vector; and
applying the normalized adjusted shading normal vector to shade the tessellated surface for rendering a computer graphics image to minimize visual artifacts in the computer graphics image.

20. The system of claim 19, wherein faceting, edge discontinuity or edge darkening artifacts for the rendered computer graphics image of the tessellated surface are reduced as compared to a rendered computer graphics image of the tessellated surface when the shading normal vector is not adjusted.

* * * * *